United States Patent
Tatsumi et al.

(10) Patent No.: US 10,744,832 B2
(45) Date of Patent: Aug. 18, 2020

(54) CONTROL ARM

(71) Applicant: NIPPON STEEL & SUMITOMO METAL CORPORATION, Tokyo (JP)

(72) Inventors: Yujiro Tatsumi, Tokyo (JP); Kenichiro Otsuka, Tokyo (JP); Yoshiaki Nakazawa, Tokyo (JP); Masanori Yasuyama, Tokyo (JP); Hitoshi Sakuma, Aichi (JP); Ayaka Musha, Aichi (JP)

(73) Assignee: NIPPON STEEL CORPORATION, Tokyo (JP)

( * ) Notice: Subject to any disclaimer, the term of this patent is extended or adjusted under 35 U.S.C. 154(b) by 159 days.

(21) Appl. No.: 15/781,718

(22) PCT Filed: Dec. 9, 2016

(86) PCT No.: PCT/JP2016/086683
§ 371 (c)(1),
(2) Date: Jun. 6, 2018

(87) PCT Pub. No.: WO2017/099212
PCT Pub. Date: Jun. 15, 2017

(65) Prior Publication Data
US 2018/0354328 A1 Dec. 13, 2018

(30) Foreign Application Priority Data
Dec. 9, 2015 (JP) .................. 2015-240075

(51) Int. Cl.
*B60G 7/00* (2006.01)
(52) U.S. Cl.
CPC ........ *B60G 7/001* (2013.01); *B60G 2206/121* (2013.01); *B60G 2206/8201* (2013.01)

(58) Field of Classification Search
CPC ............ B60G 7/001; B60G 2204/1434; B60G 21/051; B60G 2206/121; B60G 2206/10; B60G 2206/8201; B62D 21/11
See application file for complete search history.

(56) References Cited

U.S. PATENT DOCUMENTS

| 2,420,716 A | 5/1947 | Millward |
| 2012/0001397 A1* | 1/2012 | McLaughlin ......... B23K 20/12 280/124.1 |

(Continued)

FOREIGN PATENT DOCUMENTS

| JP | 2000-142052 | 5/2000 |
| JP | 2004-262453 | 9/2004 |

(Continued)

*Primary Examiner* — Karen Beck
(74) *Attorney, Agent, or Firm* — Clark & Brody LP

(57) ABSTRACT

A control arm includes a pair of mounting portions provided separately from each other and a main body portion extending in a X-direction and connecting the pair of mounting portions. At a cross-section perpendicular to the X-direction at a position along the X-direction, the main body portion includes: a first V-shaped member having a first apex and opening from the first apex in a V-shape toward one side in a Y-direction, and a second V-shaped member having a second apex and opening from the second apex in a V-shape toward the other side in the Y-direction. At the cross-section, the first apex and the second apex are joined. At a cross-section perpendicular to the X-direction at the center position of the main body portion in the X-direction, an opening angle of the first V-shaped member and an opening angle of the second V-shaped member are each no more than 150°.

12 Claims, 15 Drawing Sheets

(56) References Cited

U.S. PATENT DOCUMENTS

2017/0297132 A1* 10/2017 Ogawa .................. B62D 27/02
2017/0305228 A1* 10/2017 Aitoh ..................... B60G 7/001
2018/0354328 A1* 12/2018 Tatsumi ................ B60G 7/001

FOREIGN PATENT DOCUMENTS

| JP | 2004-533355 | 11/2004 | | |
|----|----|----|----|----|
| JP | 2009-286325 | 12/2009 | | |
| JP | 2010-076473 | 4/2010 | | |
| JP | 2012-509800 | 4/2012 | | |
| JP | 2017105296 A | * | 6/2017 | ............ B60G 7/001 |
| KR | 10-2011-0059350 | 6/2011 | | |

* cited by examiner

CONTROL ARM

TECHNICAL FIELD

The present invention relates to a control arm of a suspension of an automobile.

BACKGROUND ART

A control arm (also called a "suspension arm") is an arm for controlling the movement of wheels. The control arm is an important component that cushions the impact from the road surface and determines not only the riding comfort but also the travel performance and vehicle height and the like.

The manner in which an I-type control arm 1 is mounted to the suspension of an automobile will now be described using FIG. 15. FIG. 15 illustrates the control arm 1 viewed down from an upper part of the vehicle body.

As illustrated in FIG. 15, the control arm 1 is a component that has a long shape and connects a vehicle body 2 and an axle 3. More specifically, the control arm 1 is a component for positioning the axle 3 in the longitudinal direction or the transverse direction of the body 2, and for also enabling movement of the axle 3 with respect to the body 2 in the vertical direction.

The control arm 1 is amiably attached to the body 2 and the axle 3 through connection brackets 4 or connection tubes (not illustrated), for example. When the axle 3 displaces in the vertical direction, the control arm 1 controls the motion of tires 5 in a suitable and supple manner by turning with respect to the body 2 and the axle 3 and also by torsional deformation of the main body portion. By this means, the grip of the tires 5 can be improved, and the steering stability of the automobile when turning is enhanced. Further, an impact that the body 2 receives when the tires 5 run over a step such as a sidewalk can be absorbed.

The currently available types of control arms include the I-type arm (hereunder, referred to as "I-arm") 1 that has an I-shaped external shape as illustrated in FIG. 15, and an A-type arm that has an A-shaped external shape. Of these two types, the I-arm 1 is adopted in many kinds of vehicles, especially in the kinds of vehicle that have a link-type suspension, because the structure of the I-arm is simple and consequently an increase in production costs can be suppressed. Although a round steel bar or a steel pipe has conventionally been used for the main body portion of the I-arm 1, the round steel bar has a large weight, while if a steel pipe is used the cost increases.

As described above, the I-arm 1 is an extremely important component for improving the steering stability and riding comfort. In order to reliably position the axle 3 in the longitudinal direction or transverse direction of the body 2, there is a need to provide the I-arm 1 with a predetermined tensile strength and compressive strength. In addition, in order to cause the axle 3 to displace in a supple manner in the vertical direction, the I-arm 1 is required to have a characteristic such that, when torsional stress is applied to the I-arm 1 as the axle 3 displaces in the vertical direction, the I-arm 1 flexibly and favorably causes torsional deformation to occur without generating bending deformation. Therefore, a large number of inventions with elaborated cross-sectional shapes of the I-arm 1 have already been proposed.

For example, an I-arm with a circular cross-section (Patent Document 1), an I-arm with a cross-sectional W-shape (Patent Document 2), an I-arm with a cross-sectional U-shape (Patent Documents 3 and 4, see FIG. 14(b)) and the like have been proposed. In addition, with respect to the lower arm of an automobile in which a stabilizer mounting portion is provided between a wheel-side mounting portion of the lower-arm main body and a body-side mounting portion, a configuration has been proposed in which an approximately cross shape is provided on a mounting portion side of the body side in the lower arm of an automobile (see Patent Document 5, FIG. 13(b)).

LIST OF PRIOR ART DOCUMENTS

Patent Document

Patent Document 1: JP2010-76473A
Patent Document 2: JP2004-533355A
Patent Document 3: JP2009-286325A
Patent Document 4: JP2012-509800A
Patent Document 5: JP2000-142052A

SUMMARY OF INVENTION

Technical Problem

As described above, although instances with various elaborated cross-sectional shapes of an I-arm have been reported, in recent years there is a strong demand for additional improvements in steering stability and riding comfort, and consequently there is a demand to further reduce torsional rigidity.

An objective of the present invention is to provide a control arm that is light in weight and has high buckling strength, and in which torsional rigidity is low and which exhibits favorable torsional deformation performance.

Solution to Problem

As a result of wholehearted research, the present inventors discovered that, by adopting a main body portion in which two V-shaped members are joined together at their respective apexes, a control arm is obtained that is light in weight and has high buckling strength, and in which torsional rigidity is low and which exhibits favorable torsional deformation performance.

The present invention is as described below.

(1) A control arm including a pair of mounting portions that are provided separately from each other, and a main body portion extending in a first direction and connecting the pair of mounting portions, wherein:

at a cross-section that is perpendicular to the first direction at a position along the first direction, the main body portion includes:

a first V-shaped member having a first apex, the first V-shaped member opening from the first apex in a V-shape toward one side in a second direction that is perpendicular to the first direction, and a second V-shaped member having a second apex, the second V-shaped member opening from the second apex in a V-shape toward the other side in the second direction;

the first apex and the second apex are joined at the cross-section; and at a cross-section perpendicular to the first direction at a center position of the main body portion in the first direction, an opening angle of the first V-shaped member and an opening angle of the second V-shaped member are each no more than 150°.

(2) The control arm described in (1) above, wherein:
a radius of curvature at the first apex and a radius of curvature at the second apex are each from 1 to 10 mm.

(3) The control arm described in (1) or (2) above, wherein: when an interval in the first direction between the pair of mounting portions is L, a total length of a portion at which the first apex and the second apex are joined is L/20 or more.

(4) The control arm described in any one of (1) to (3) above, wherein:
when an interval in the first direction between the pair of mounting portions is L, a total length of a portion at which the first apex and the second apex are joined is less than L.

(5) The control arm described in any one of (1) to (4) above, wherein:
the first V-shaped member and the second V-shaped member are each composed of a steel sheet having a tensile strength of 390 MPa-class or more.

(6) The control arm described in (5) above, wherein:
a thickness of the steel sheet is 2 to 3 mm.

Advantageous Effects of Invention

According to the present invention it is possible to obtain a control arm that has a light weight and high buckling strength, and in which torsional rigidity is low and which exhibits favorable torsional deformation performance.

DESCRIPTION OF EMBODIMENTS

Figure 1:
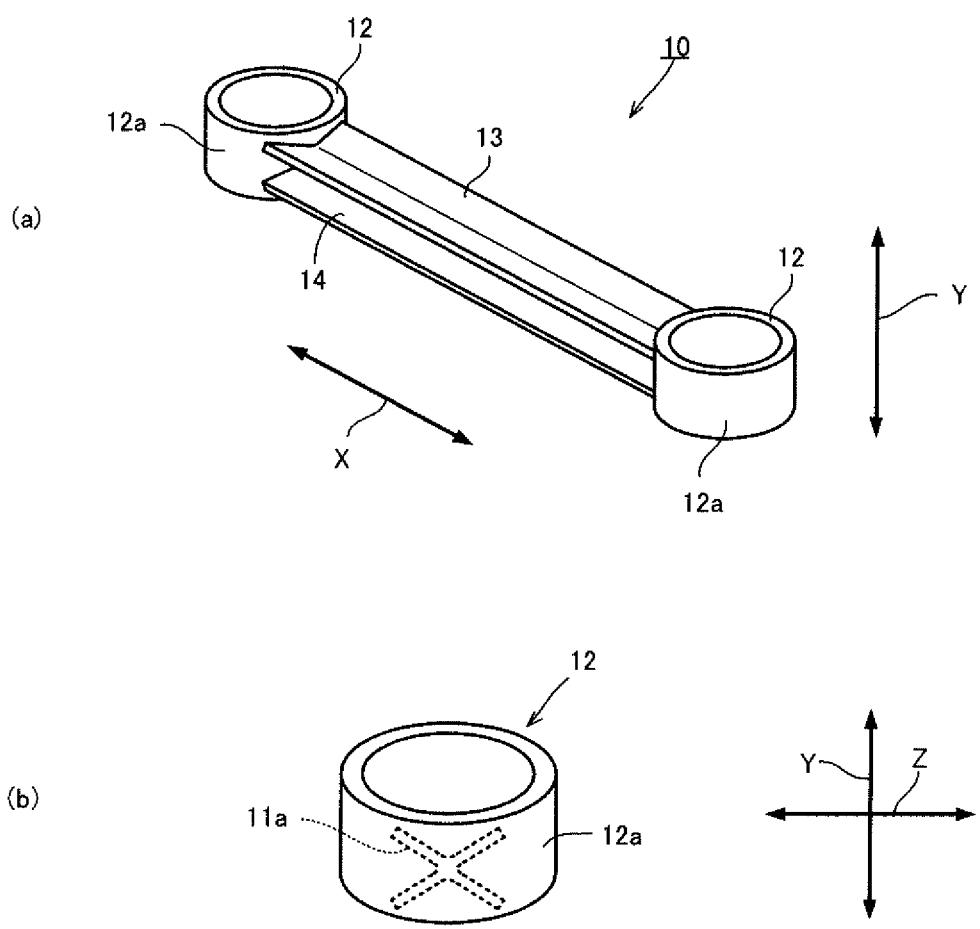
FIG. 1(a) is a perspective view of a control arm according to one embodiment of the present invention.
FIG. 1(b) is a view for describing a mounting portion.

Hereunder, a control arm according to one embodiment of the present invention is described while referring to the drawings. Note that, the term "control arm" refers to a component for connecting the body and axle of an automobile, and for allowing the axle to displace in the vertical direction with respect to the body while positioning the axle in the longitudinal direction of the body.

FIG. 1(a) is a perspective view of a control arm 10 according to one embodiment of the present invention. The control arm 10 includes a main body portion 11 and a pair of mounting portions 12. As illustrated in FIG. 1(a), the pair of mounting portions 12 are provided separately from each other, and the main body portion 11 extends in a first direction (X-direction shown in FIG. 1(a)) and connects the pair of mounting portions 12.

FIG. 1(b) is a view for describing the mounting portion 12. The mounting portion 12 is a component for connecting to a connection tube or a connection bracket. In the present embodiment, the mounting portion 12 has a hollow-shell cylindrical shape, and as illustrated in FIG. 1(b), the main body portion 11 is joined to an outer peripheral surface 12a of the mounting portion 12. In FIG. 1(b), a joint location 11a between the main body portion 11 and the mounting portion 12 is shown by a broken line.

Figure 2:
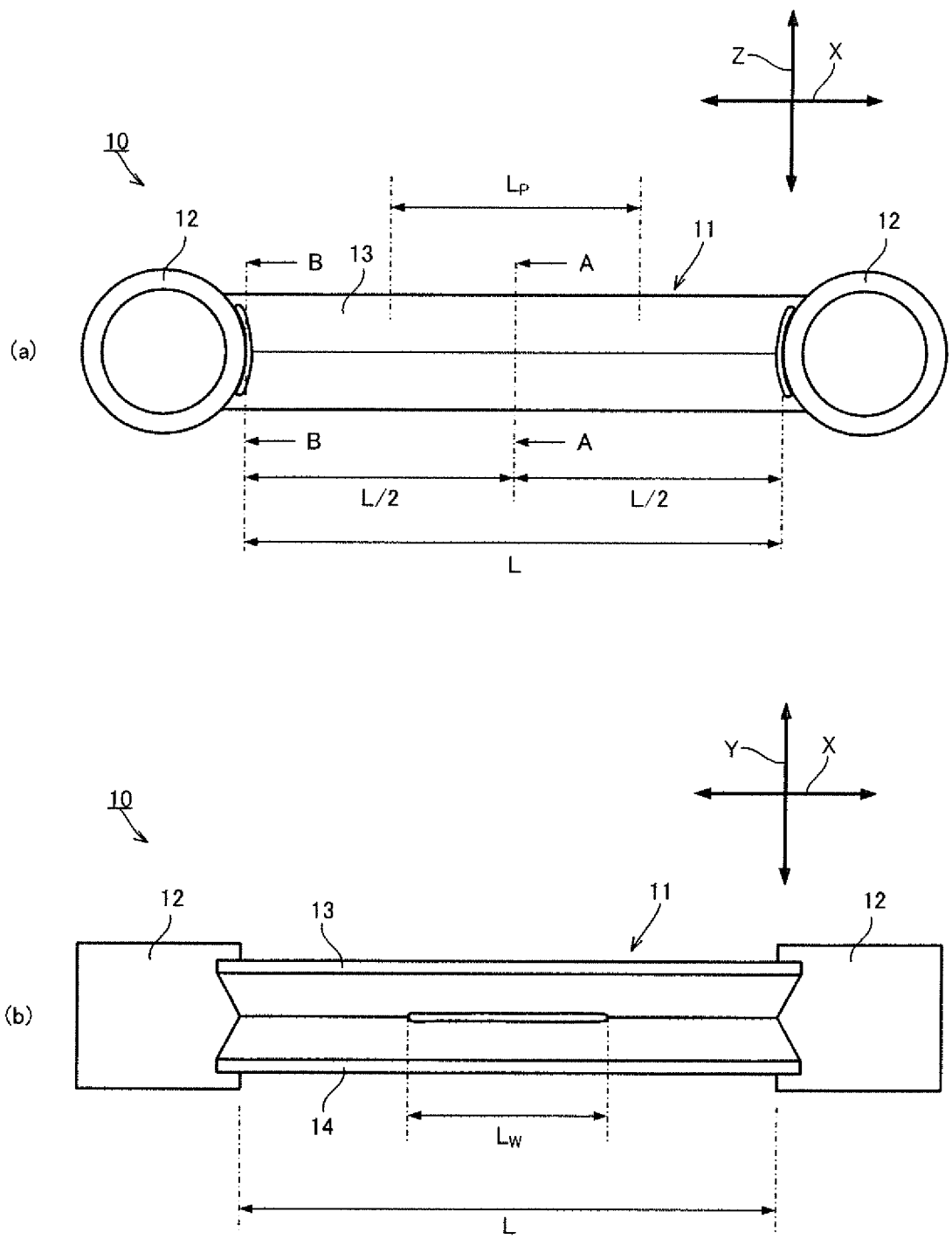
FIG. 2(a) is a plan view of a control arm according to one embodiment of the present invention.
FIG. 2(b) is a side view.
Figure 3:
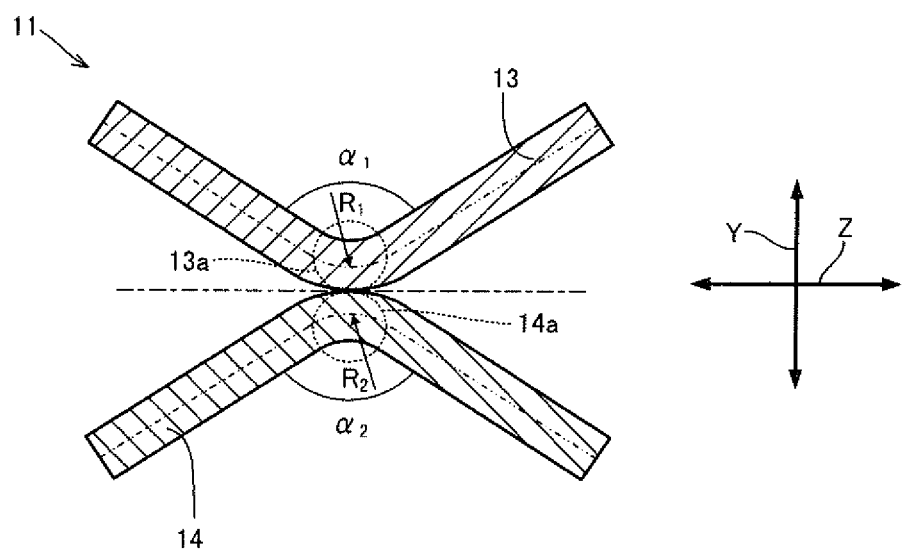
FIG. 3 is a view for describing the shape of a main body portion at an A-A cross-section.

FIG. 2(a) is a plan view of the control arm 10 according to one embodiment of the present invention, and FIG. 2(b) is a side view of the control arm 10. FIG. 3 is a view for describing the shape of the main body portion 11 at a cross-section (A-A cross-section shown in FIG. 2(a)) perpendicular to the first direction, at a center position of the main body portion 11 in the first direction. As illustrated in FIG. 3, the main body portion 11 includes a first V-shaped member 13 and a second V-shaped member 14, and has an X-like shape at the A-A cross-section.

At the A-A cross-section, the first V-shaped member 13 has a first apex 13a, and has a shape that opens in a V-shape from the first apex 13a toward one side in a second direction (Y-direction shown in FIG. 3) that is perpendicular to the first direction. Similarly, at the A-A cross-section, the second V-shaped member 14 has a second apex 14a, and has a shape that opens in a V-shape from the second apex 14a toward the other side in the second direction. The first apex 13a and the second apex 14a are joined at the A-A cross-section.

Further, at the A-A cross-section, an opening angle $\alpha_1$ of the first V-shaped member 13 and an opening angle $\alpha_2$ of the second V-shaped member 14 are each set to be not more than 150°. Because the main body portion 11 has the shape described above, the control arm 10 that has a light weight and high buckling strength is obtained.

Preferably, the opening angles $\alpha_1$ and $\alpha_2$ are equal angles. Further, preferably, at the A-A cross-section, the first V-shaped member 13 and the second V-shaped member 14 are axisymmetric about, as an axis of symmetry, a virtual straight line (straight line indicated by a dashed line in FIG. 3) extending in a third direction (Z-direction shown in FIG. 3) that is perpendicular to the first direction and second direction and passes through the center of the main body portion 11. Because the first V-shaped member 13 and the second V-shaped member 14 have favorable symmetry, the buckling strength and the torsional deformation performance are further improved.

Note that, it is not necessary for the V-shaped members to be strictly bilaterally symmetrical. Any level of symmetry of the V-shaped members may be acceptable unless the effect exerted by the control arm of the present invention is lost due to the level of symmetry. Asymmetry caused by variations due to the production circumstances, and asymmetry due to design changes made to suit the structure of the body are within the V-shaped members of the present invention.

As the first V-shaped member and the second V-shaped member, members that are both symmetrical, members in which one of the members is symmetrical, or members that are both asymmetrical may be combined and used.

Figure 4:
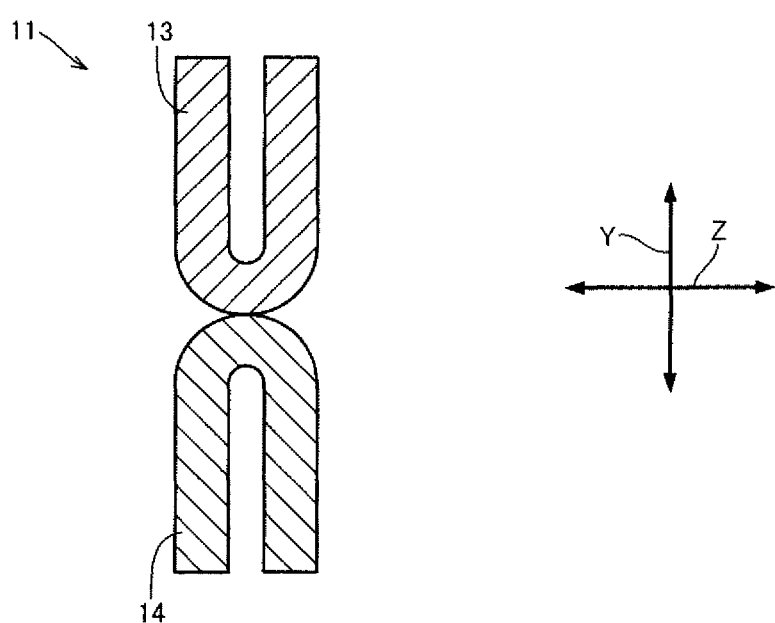
FIG. 4 is a view for describing a shape at a cross-section perpendicular to a first direction, of a main body portion that a control arm according to another embodiment of the present invention includes.

The opening angles $\alpha_1$ and $\alpha_2$ include the angle 0°. In such a case, the cross-sectional shape will be as shown in FIG. 4, and even when the cross-sectional shape is of such shape, because the two members are joined at the apexes thereof, excellent buckling strength and torsional deformation performance are exhibited.

In addition, referring to FIG. 3, preferably, the radii of curvature R1 and R2 of the first apex 13a and the second apex 14a are each from 1 to 10 mm. If the radius of curvature is less than 1 mm, there is a risk that cracks will occur when forming the V-shaped members. On the other hand, if the radius of curvature is more than 10 mm, the shape will no longer be a V-shape. Note that, in the present invention, the term "radius of curvature" refers to a value of the radius of curvature at a center portion of the wall thickness of the first apex 13a and the second apex 14a.

In the present embodiment, as illustrated in FIG. 2(b), the first apex 13a and the second apex 14a are joined at a region that includes the center position of the main body portion 11. In the case of welding the first apex 13a and the second apex 14a at the center position of the main body portion 11, when pressing down the material with a welding clamp at both ends of the main body portion 11, a load can be applied equally to the first V-shaped member 13 and the second V-shaped member 14, and stable welding is possible, and therefore welding at the center position of the main body portion 11 is preferable.

The welding position is not limited to the above example. The first apex 13a and the second apex 14a may be joined at an arbitrary position in the first direction. However, if the welding is performed at the position at an endmost part, there is a possibility of interfering with a weld zone between the main body portion 11 and the mounting portion 12, causing the welding stability at such an interference portion to deteriorate. Therefore, it is preferable to join the first apex 13a and the second apex 14a at a region that is separated by 5 mm or more from an endmost part.

Further, it is not necessary for the first apex 13a and the second apex 14a to be joined along the entire length of the main body portion 11. By changing the length of a portion at which the first apex 13a and the second apex 14a are joined, it is possible to adjust the balance between the buckling strength and torsional rigidity of the control arm 10. In other words, the buckling strength can be increased by making the joint length longer, while on the other hand the torsional rigidity can be reduced by making the joint length smaller.

When the interval in the first direction between the pair of mounting portions 12 is L, a joint length $L_W$ between the first apex 13a and the second apex 14a is preferably made L/20 or more to raise the buckling strength. Further, if the joint length is small, when a large amount of torsion arises, the stress will concentrate at the joint location and there is a risk that the first apex 13a and the second apex 14a will peel off from each other at the joined portion. Therefore, the joint length $L_W$ is more preferably 6 L/20 or more. On the other hand, in order to reduce the torsional rigidity it is preferable to make the joint length $L_W$ less than L, and more preferably 12 L/20 or less.

Note that, joining of the first apex 13a and the second apex 14a may be continuously performed or may be intermittently performed. If the joined portions are intermittent, the joint length $L_W$ is the total length of the portions at which the first apex 13a and the second apex 14a are joined.

Figure 5:
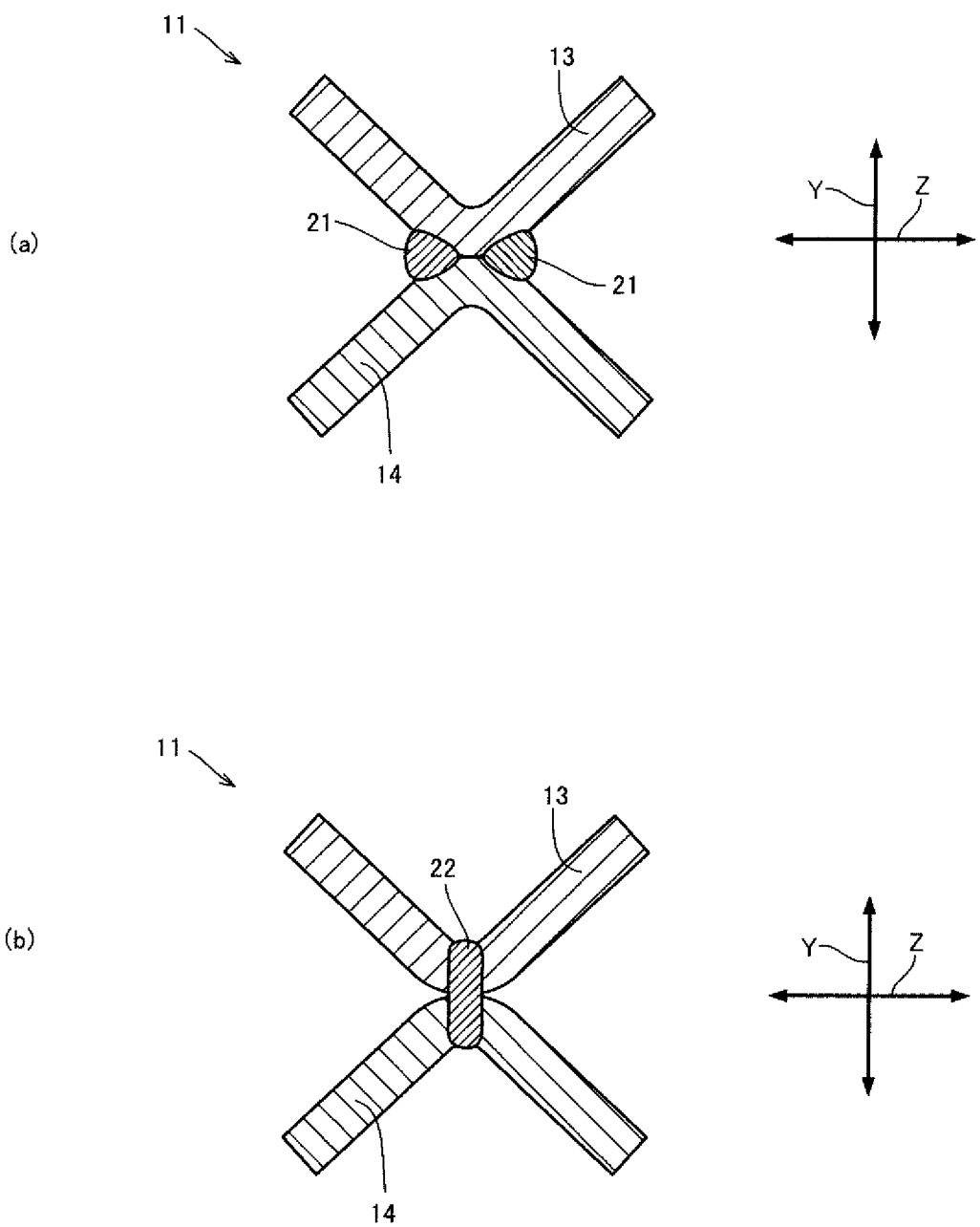
FIG. 5 is a view for describing examples of methods for joining a first apex and a second apex (a: flare welding, b: stack welding).

FIG. 5 is a view for describing examples of methods for joining the first apex 13a and the second apex 14a (a: flare welding, b: stack welding). As illustrated in FIG. 5(a), flare welding may be performed from both sides in the Z-direction to form a flare weld zone 21, or as illustrated in FIG. 5(b), stack welding may be performed in the Y-direction to form a stack weld zone 22. Further, the flare weld zone 21 may be formed on only one side in the Z-direction.

Note that, a filler wire may be fed or need not be fed when performing the welding. However, in the case of feeding a filler wire, the cross-sectional area of the main body portion 11 after welding increases compared to before welding. Because an increase in the cross-sectional area leads to an increase in torsional rigidity, it is preferable to suppress the percentage increase in the cross-sectional area between before and after welding to 10% or less, and more preferably to suppress the percentage increase to 5% or less.

A method for joining the first apex 13a and the second apex 14a is not limited to the above examples, and laser welding, seam welding, or adhesive joining or the like may also be used.

The first V-shaped member 13 and the second V-shaped member 14 are preferably constituted by a steel sheet having a tensile strength of 390 MPa-class or more. In the case of using a steel sheet having a low tensile strength, it is necessary to use a steel sheet with a large sheet thickness to secure the necessary strength. However, this is not preferable because the weight increases as the sheet thickness increases, and the torsional rigidity also increases.

When using a steel sheet having a tensile strength of 390 MPa-class or more, it is preferable to use a thin steel sheet having a thickness of 2 to 3 mm. The reason is that if the sheet thickness is less than 2 mm, corrosion resistance will be insufficient, while if the sheet thickness is more than 3 mm, there is a risk that it will not be possible to sufficiently reduce the torsional rigidity.

Hereunder, the present invention is described specifically by way of examples, although the present invention is not limited to the following examples.

Example 1

Under a condition in which the cross-sectional area of the main body portion 11 was made constant, a preferable range of the opening angle $\alpha_1$ of the first V-shaped member 13 and the opening angle $\alpha_2$ of the second V-shaped member 14 with respect to torsional rigidity and buckling strength was investigated by analysis by means of computer simulation while the tensile strength of the main body portion 11 was kept equal. In the present example, the opening angles $\alpha_1$ and $\alpha_2$ were made equal values ($\alpha$).

A press-formed product with a radius of curvature of 4 mm that was a hot-rolled steel sheet with a tensile strength of 440 MPa-class having a sheet thickness of 2.6 mm and a sheet width of 30 mm was used as the first V-shaped member 13 and the second V-shaped member 14. The first apex 13a and the second apex 14a of the first V-shaped member 13 and the second V-shaped member 14 were joined along the entire length thereof to form a main body portion 11 having an X-shaped cross-sectional shape. A control arm that included the main body portion 11 was subjected to analysis as an analysis model. A summary of the mechanical properties of the aforementioned hot-rolled steel sheet is shown in Table 1.

TABLE 1

|  | YP (MPa) | TS (MPa) | EL (%) |
|---|---|---|---|
| JSH440 | 321 | 462 | 40.4 |

The opening angle α at a center position of the main body portion 11 in the first direction was varied within a range of 0 to 165°, and one end of the main body portion 11 was restrained and the other end was subjected to a rotational displacement, and the torsional rigidity and buckling strength were evaluated. Note that, the entire length of the main body portion 11 was set to 230 mm.

Figure 6:
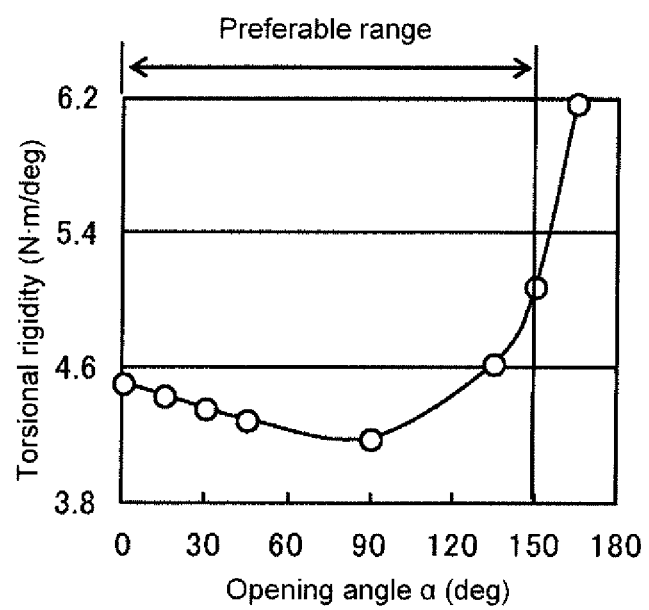
FIG. 6 is a graph illustrating the relation between an opening angle α and torsional rigidity.

The relation between the opening angle α and torsional rigidity is illustrated in a graph in FIG. 6. The relation between the opening angle α and the buckling strength is illustrated in a graph in FIG. 7.

Figure 7:
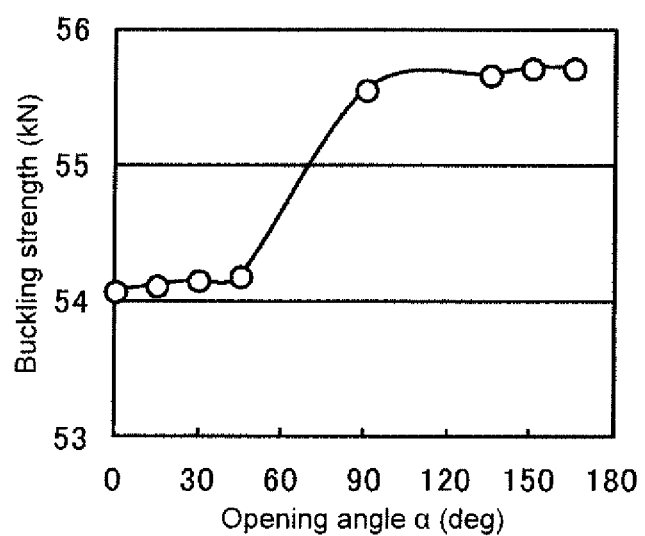
FIG. 7 is a graph illustrating the relation between the opening angle α and buckling strength.

As illustrated in FIG. 7, the buckling strength was around 55.5 kN when the opening angle α was 90° or more. Further, even when the opening angle α was less than 90°, the buckling strength was around 54 kN and there was thus only a slight difference compared to the case where the opening angle α was 90° or more. In other words, the buckling strength is favorable at whatever angle the opening angle α is set to.

In contrast, as illustrated in FIG. 6, when the opening angle α was more than 150°, the torsional rigidity was more than 5 N·m/deg, which represented a significant increase.

Example 2

In an analysis by means of computer simulation performed in Example 2, analysis of the buckling strength was performed in a case where, while keeping the opening angle α constant at 90°, the joint length between the first apex 13a and the second apex 14a was varied.

According to the results of the numerical analysis, although the buckling strength was 55.5 kN when the first apex 13a and the second apex 14a were joined across the entire length of the main body portion 11, the buckling strength decreased to 44 kN when the first apex 13a and the second apex 14a were not joined at all. A large joint length is effective for improving the buckling strength. However, it was found that, when the entire length of the main body portion 11 is L, if the joint length between the first apex 13a and the second apex 14a is made L/20 or more, a buckling strength of 47 kN or more can be secured, and this causes no problem for practical use.

Example 3

Figure 8:
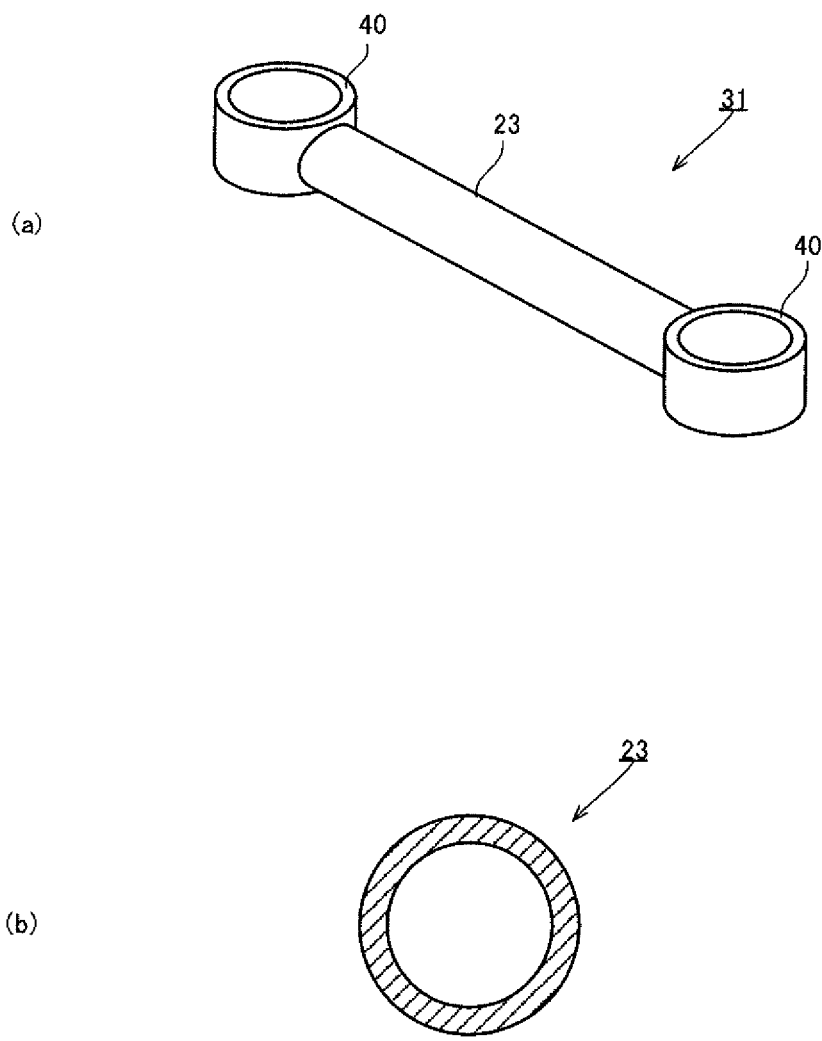
FIG. 8 is a view for describing the structure of a control arm of a comparative example 1.
Figure 9:
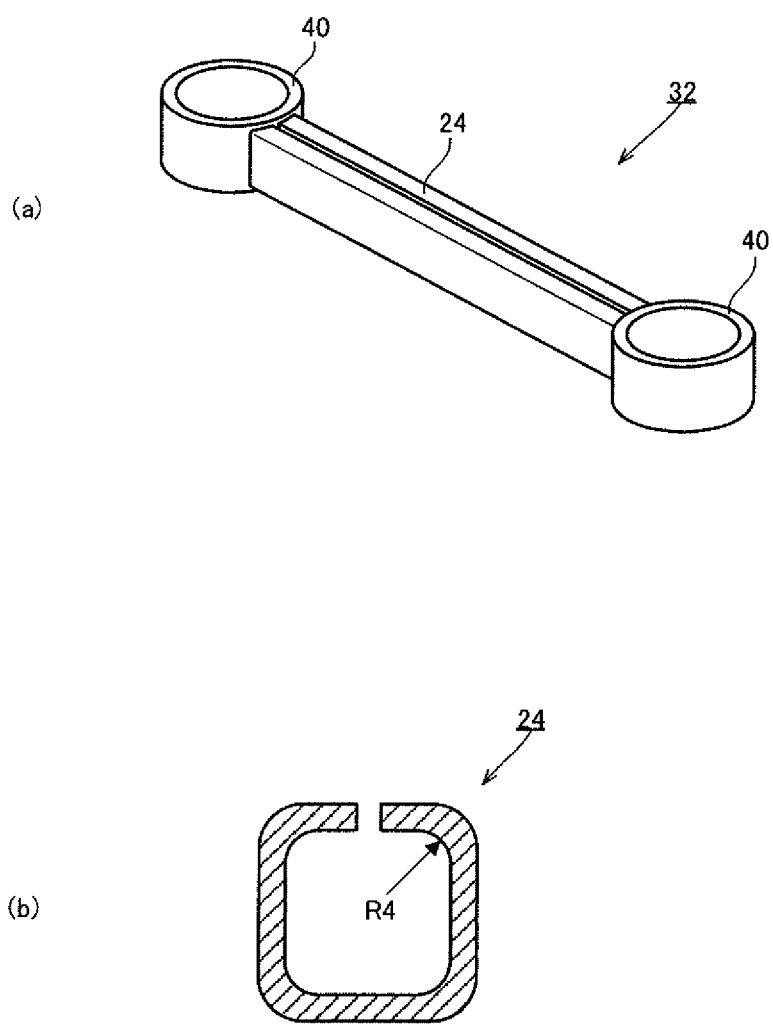
FIG. 9 is a view for describing the structure of a control arm of a comparative example 2.
Figure 10:
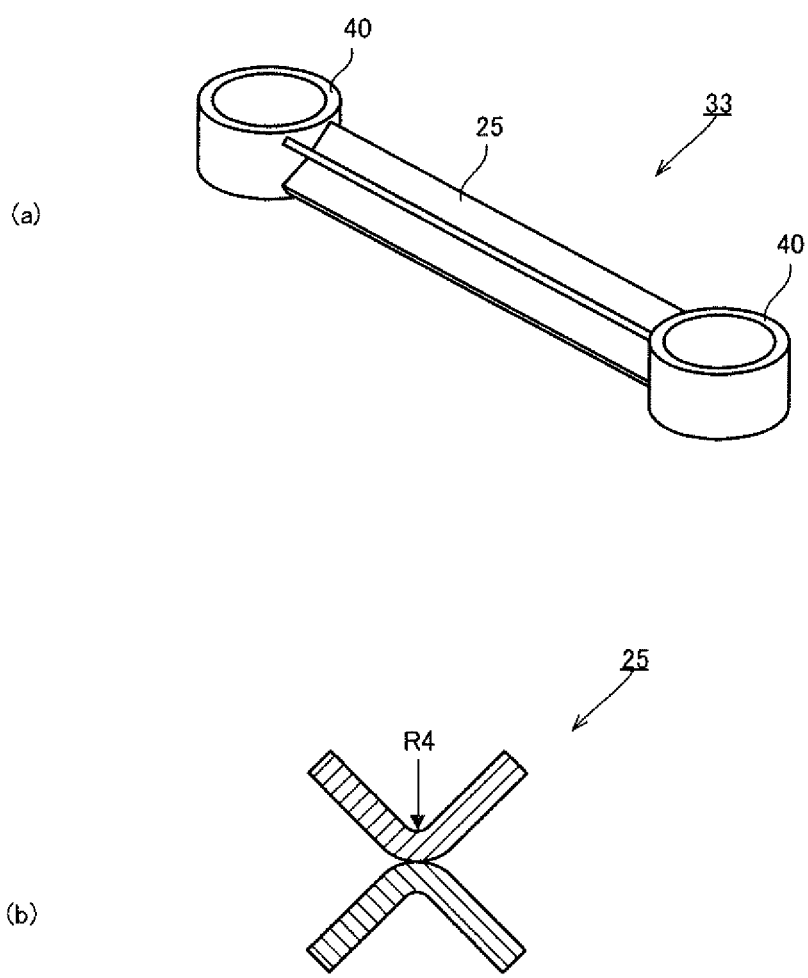
FIG. 10 is a view for describing the structure of a control arm of an inventive example 1 of the present invention.

FIGS. 8 to 10 are views for describing the structure of a control arm of comparative examples 1 and 2 and an inventive example 1 of the present invention. In a control arm 31 of comparative example 1, a main body portion 23 has a closed cross-sectional shape, and in a control arm 32 of comparative example 2, a main body portion 24 has an open cross-sectional shape. Further, in a control arm 33 of inventive example 1 of the present invention, a main body portion 25 has an X-shaped cross-sectional shape.

A carbon steel pipe for machine structural use STKM 13A having an outer diameter of 54 mm, an inner diameter of 42 mm and a length of 31 mm was used for the mounting portions 40 in each of the control arms 31 to 33. Further, hot-rolled steel sheet with a tensile strength of a 440 MPa-class and a sheet thickness of 2.6 mm and having the mechanical properties shown in the aforementioned Table 1 was used for the main body portion 25 of inventive example 1 of the present invention.

Taking into consideration the fact that the base metal had a tensile strength of 440 MPa-class, adjustment of the sheet thickness and total sheet width was performed so that the strength of the relevant member became 68 kN. Specifically, in comparative example 1, the total sheet width was made 53 mm and the sheet thickness was made 2.8 mm, in comparative example 2 the total sheet width was made 60 mm and the sheet thickness was made 2.6 mm, and in inventive example 1 of the present invention, the total sheet width was made 60 mm and the sheet thickness was made 2.6 mm. Note that, in comparative example 1, the diameter at a center position in the sheet thickness direction was made 16.8 mm. In the present invention, the term "total sheet width" refers to the total amount of the sheet width of a sheet material that is used for manufacturing the aforementioned members.

In inventive example 1 of the present invention, steel sheets with an overall length of 230 mm and a sheet width of 30 mm were subjected to press-forming and bent at a center position in the width direction to produce a first V-shaped member and a second V-shaped member with an approximately V-shaped cross-section having a radius of curvature of 4 mm at the center of the sheet thickness, and thereafter the first V-shaped member and the second V-shaped member were joined by performing flare welding from both sides. Arc welding for which filler wire was fed was performed along the entire length to thereby assemble the main body portion 25. In other words, the total joint length in the first direction was 230 mm. The main body portion 25 had a uniform cross-sectional shape along the entire length in the first direction.

Thereafter, the mounting portions 40 were butted against the main body portion 25, and arc welding was performed along the entire X-shaped circumference to thereby produce the control arm 33. An evaluation of the torsional rigidity and buckling strength of the control arms was performed. The evaluation results are illustrated in the graphs in FIGS. 11 and 12.

Figure 11:
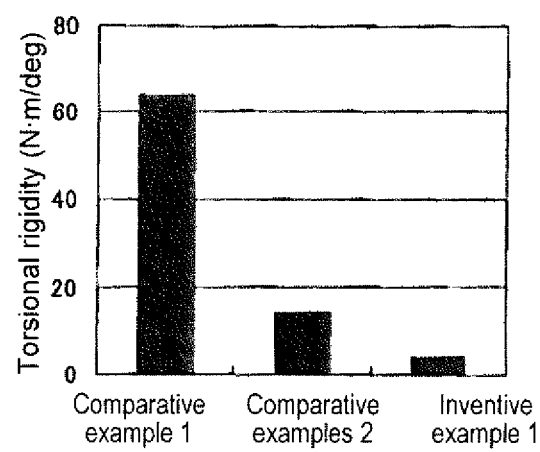
FIG. 11 is a graph illustrating evaluation results with respect to torsional rigidity in Example 3.

As illustrated in FIG. 11, while the torsional rigidity was 64 N·m/deg in comparative example 1 and 15 N·m/deg in comparative example 2, in inventive example 1 of the present invention the torsional rigidity decreased significantly to 5 N·m/deg and favorable torsional deformation performance was obtained.

Figure 12:
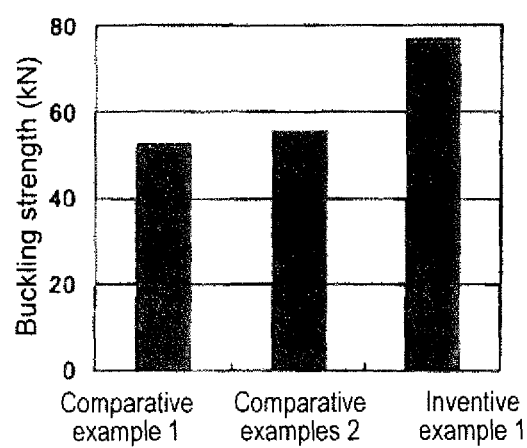
FIG. 12 is a graph illustrating evaluation results with respect to buckling strength in Example 3.

Further, as illustrated in FIG. 12, it was found that the buckling strength of inventive example 1 of the present invention was higher than the buckling strength of comparative example 1 and comparative example 2.

The factors that cause the buckling strength of inventive example 1 of the present invention to be high include the influence of an increase of around 5% in the cross-sectional area as a result of feeding the filler wire. However, it has been confirmed separately that even when there is no increase in the cross-sectional area, buckling strength that is approximately equal to the buckling strength of comparative examples 1 and 2 is obtained.

Example 4

Figure 13:
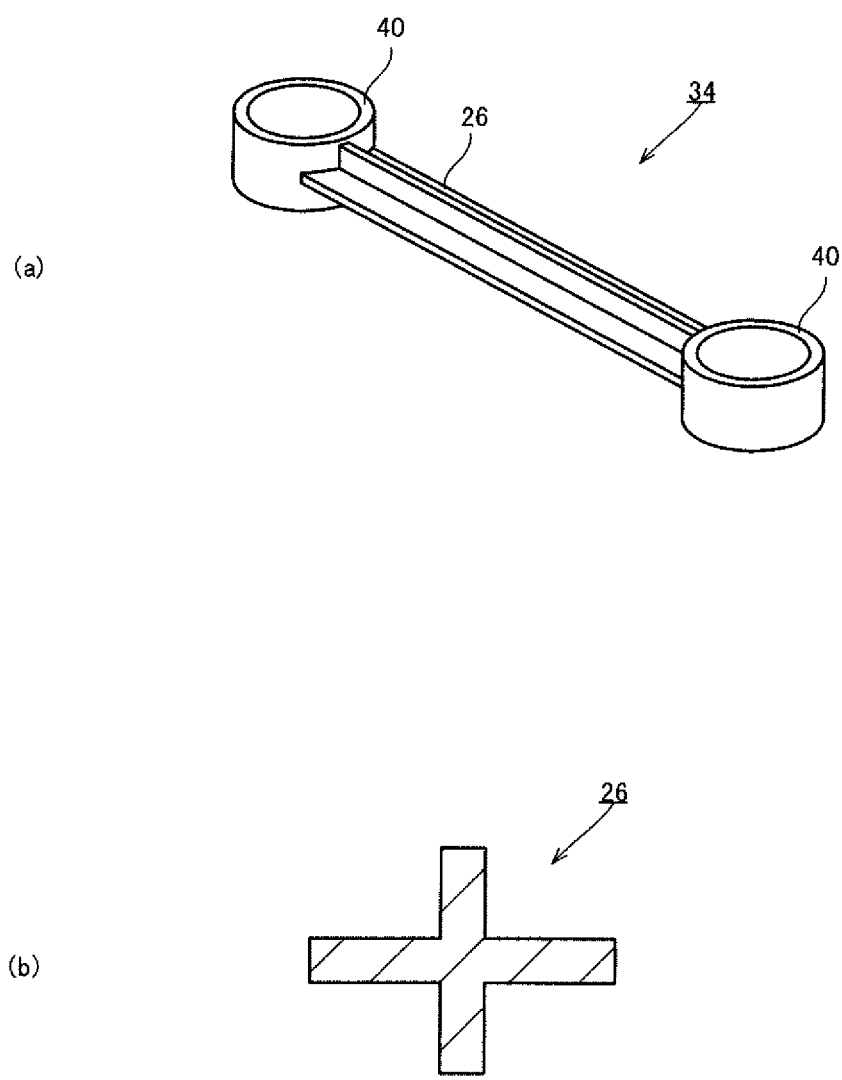
FIG. 13 is a view for describing the structure of a control arm of a comparative example 3.
Figure 14:
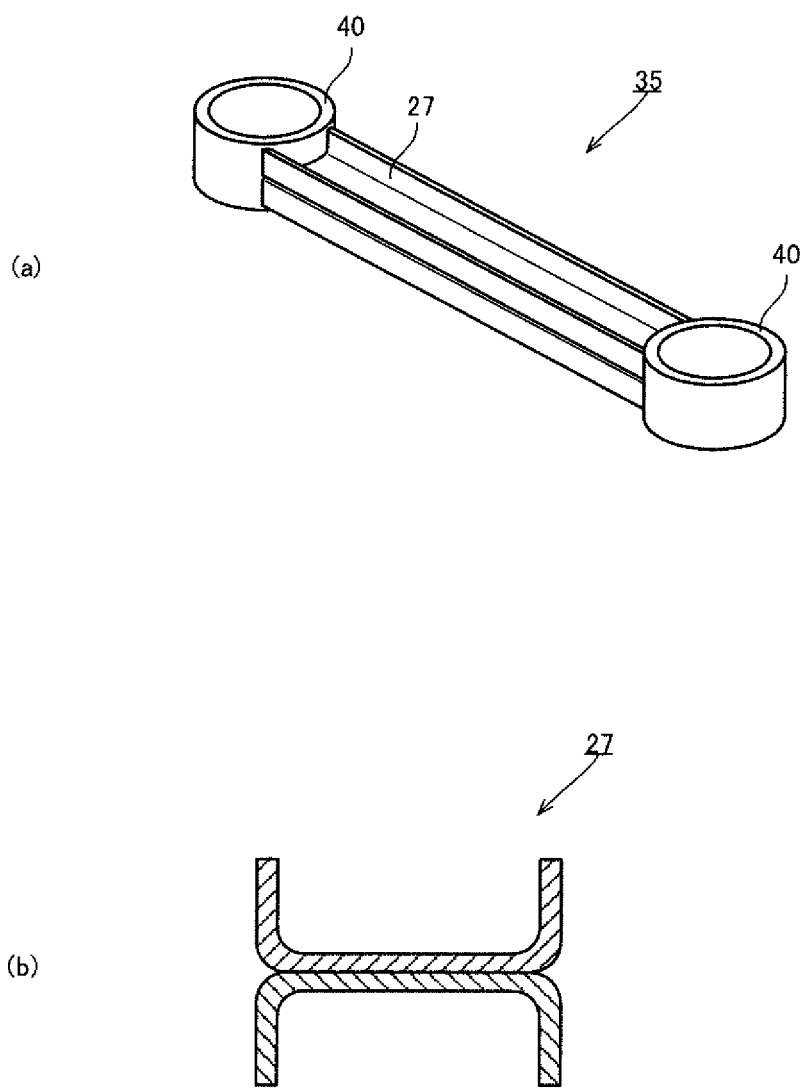
FIG. 14 is a view for describing the structure of a control arm of a comparative example 4.
Figure 15:
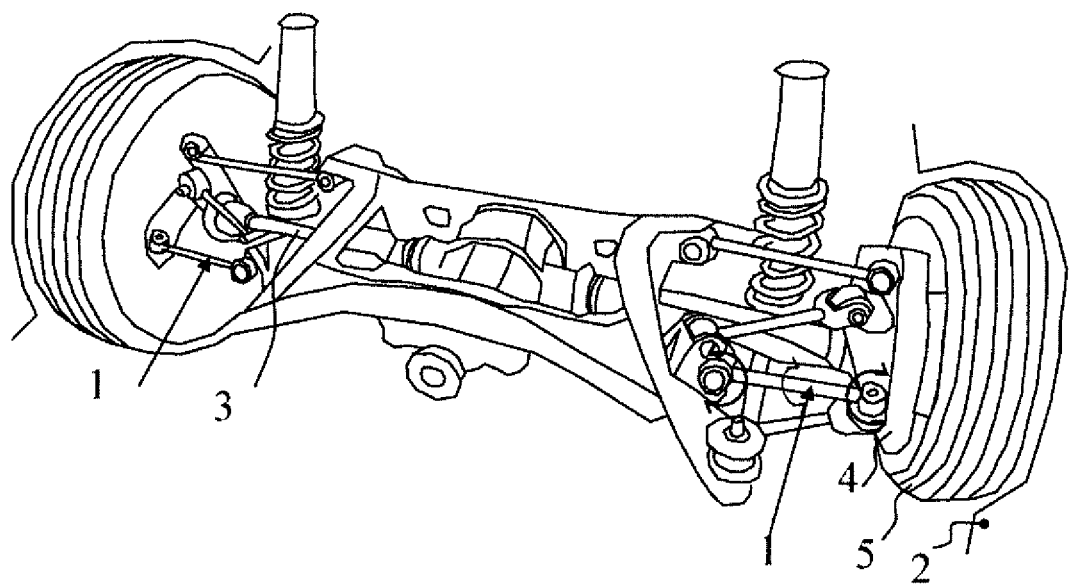
FIG. 15 is an explanatory diagram illustrating the manner of mounting an I-type control arm to the suspension of an automobile.

An additional performance evaluation test was performed using the control arm of inventive example 1 of the present invention that is shown in FIG. 10 and the control arms of comparative examples 3 and 4 shown in FIGS. 13 and 14 which were each used in Example 3. Note that, the overall length of each of the control arms 33 to 35 was made 230 mm.

In a comparative example 3, adjustment was performed to make the sheet thickness 2.6 mm and to make the strength of the member 68 kN. Further, in a comparative example 4 adjustment was performed to make the sheet thickness 2.0 mm and to make the strength of the member 76 kN. An evaluation of the torsional rigidity and buckling strength of these control arms was performed.

The results of the tests showed that, with respect to the control arm of comparative example 3, although relatively good performance was exhibited with the buckling strength being 55 kN and the torsional rigidity being 7 N·m/deg, the torsional deformation performance was inferior in comparison to the control arm of inventive example 1 of the present invention. Further, in the case of an integrally molded control arm, unlike the control arm of inventive example 1 of the present invention that includes two members, because it was not possible to change the joint length, the balance between the buckling strength and torsional deformation performance could not be adjusted.

Further, although the buckling strength of the control arm of comparative example 4 was 50 kN which represents relatively good buckling strength, the contact area was large because bottom portions that were parallel to each other were joined together, and consequently the torsional rigidity was a high value of 31 N·m/deg. In the case of the control arm of inventive example 1 of the present invention, it was found that because the curved surface portions of two apexes were joined together, the contact area was small and favorable torsional deformation performance was exhibited.

INDUSTRIAL APPLICABILITY

According to the present invention, it is possible to obtain a control arm that has a light weight and high buckling strength, in which the torsional rigidity is low and which has favorable torsional deformation performance. Therefore, favorable steering stability and riding comfort are obtained by using the control arm according to the present invention.

REFERENCE SIGNS LIST

10 Control Arm
11 Main Body Portion
12 Mounting Portion
12*a* Outer Peripheral Surface
13 First V-shaped Member
13*a* First Apex
14 Second V-shaped Member
14*a* Second Apex

The invention claimed is:

1. A control arm comprising a pair of mounting portions that are provided separately from each other, and a main body portion extending in a first direction and connecting the pair of mounting portions, wherein:
at a cross-section that is perpendicular to the first direction at a position along the first direction, the main body portion includes:
a first V-shaped member having a first apex, the first V-shaped member opening from the first apex in a V-shape toward one side in a second direction that is perpendicular to the first direction, and
a second V-shaped member having a second apex, the second V-shaped member opening from the second apex in a V-shape toward the other side in the second direction;
the first apex and the second apex are joined at the cross-section; and
at a cross-section perpendicular to the first direction at a center position of the main body portion in the first direction, an opening angle of the first V-shaped member and an opening angle of the second V-shaped member are each no more than 150°,
wherein a radius of curvature at the first apex and a radius of curvature at the second apex are each from 1 to 10 mm.

2. The control arm according to claim 1, wherein:
when an interval in the first direction between the pair of mounting portions is L, a total length of a portion at which the first apex and the second apex are joined is L/20 or more.

3. The control arm according to claim 1, wherein:
when an interval in the first direction between the pair of mounting portions is L, a total length of a portion at which the first apex and the second apex are joined is less than L.

4. The control arm according to claim 1, wherein:
the first V-shaped member and the second V-shaped member are each composed of a steel sheet having a tensile strength of 390 MPa-class or more.

5. The control arm according to claim 4, wherein:
a thickness of the steel sheet is 2 to 3 mm.

6. The control arm according to claim 2, wherein:
when an interval in the first direction between the pair of mounting portions is L, a total length of a portion at which the first apex and the second apex are joined is less than L.

7. The control arm according to claim 2, wherein:
the first V-shaped member and the second V-shaped member are each composed of a steel sheet having a tensile strength of 390 MPa-class or more.

8. The control arm according to claim 3, wherein:
the first V-shaped member and the second V-shaped member are each composed of a steel sheet having a tensile strength of 390 MPa-class or more.

9. The control arm according to claim 6, wherein:
the first V-shaped member and the second V-shaped member are each composed of a steel sheet having a tensile strength of 390 MPa-class or more.

10. The control arm according to claim 7, wherein:
a thickness of the steel sheet is 2 to 3 mm.

11. The control arm according to claim 8 wherein:
a thickness of the steel sheet is 2 to 3 mm.

12. The control arm according to claim 9, wherein:
a thickness of the steel sheet is 2 to 3 mm.

\* \* \* \* \*